US008500453B2

(12) United States Patent
Simon

(10) Patent No.: US 8,500,453 B2
(45) Date of Patent: Aug. 6, 2013

(54) APPARATUS AND METHOD FOR IMPACT ACTIVITY LEARNING SYSTEM

(76) Inventor: Steve M. Simon, San Clemente, CA (US)

( * ) Notice: Subject to any disclaimer, the term of this patent is extended or adjusted under 35 U.S.C. 154(b) by 723 days.

(21) Appl. No.: 12/655,501

(22) Filed: Dec. 30, 2009

(65) Prior Publication Data

US 2011/0104652 A1    May 5, 2011

Related U.S. Application Data

(60) Provisional application No. 61/280,303, filed on Nov. 2, 2009.

(51) Int. Cl.
    *G09B 19/00*    (2006.01)
(52) U.S. Cl.
    USPC ............... 434/365; 434/322; 434/323
(58) Field of Classification Search
    USPC .......................... 434/236, 322, 323
    See application file for complete search history.

(56) References Cited

U.S. PATENT DOCUMENTS

| | | | |
|---|---|---|---|
| 6,210,170 B1 * | 4/2001 | Sorensen et al. ............ | 434/323 |
| 6,273,421 B1 * | 8/2001 | Thalheimer et al. ......... | 273/161 |
| 2002/0111791 A1 * | 8/2002 | Candelore ..................... | 704/7 |
| 2004/0076931 A1 * | 4/2004 | Rogan et al. ................. | 434/107 |
| 2004/0214146 A1 * | 10/2004 | Harris et al. ................. | 434/191 |
| 2006/0154227 A1 * | 7/2006 | Rossi et al. .................. | 434/350 |
| 2009/0262074 A1 * | 10/2009 | Nasiri et al. ................. | 345/158 |
| 2012/0015341 A1 * | 1/2012 | Self et al. ..................... | 434/365 |

* cited by examiner

*Primary Examiner* — Robert J Utama
(74) *Attorney, Agent, or Firm* — Roy A. Ekstrand

(57) ABSTRACT

An apparatus and method for impact activity learning includes a touch sensing element and display operating in accordance with a controller and display driver together with a sound circuit and image projector. The entire system housed in an impact receiving object such as a punching bag or floor mat. The user is prompted by a set of displayed image segments in response to which the user punches or otherwise impacts the apparatus to elicit an audible and visual response from the apparatus.

9 Claims, 4 Drawing Sheets

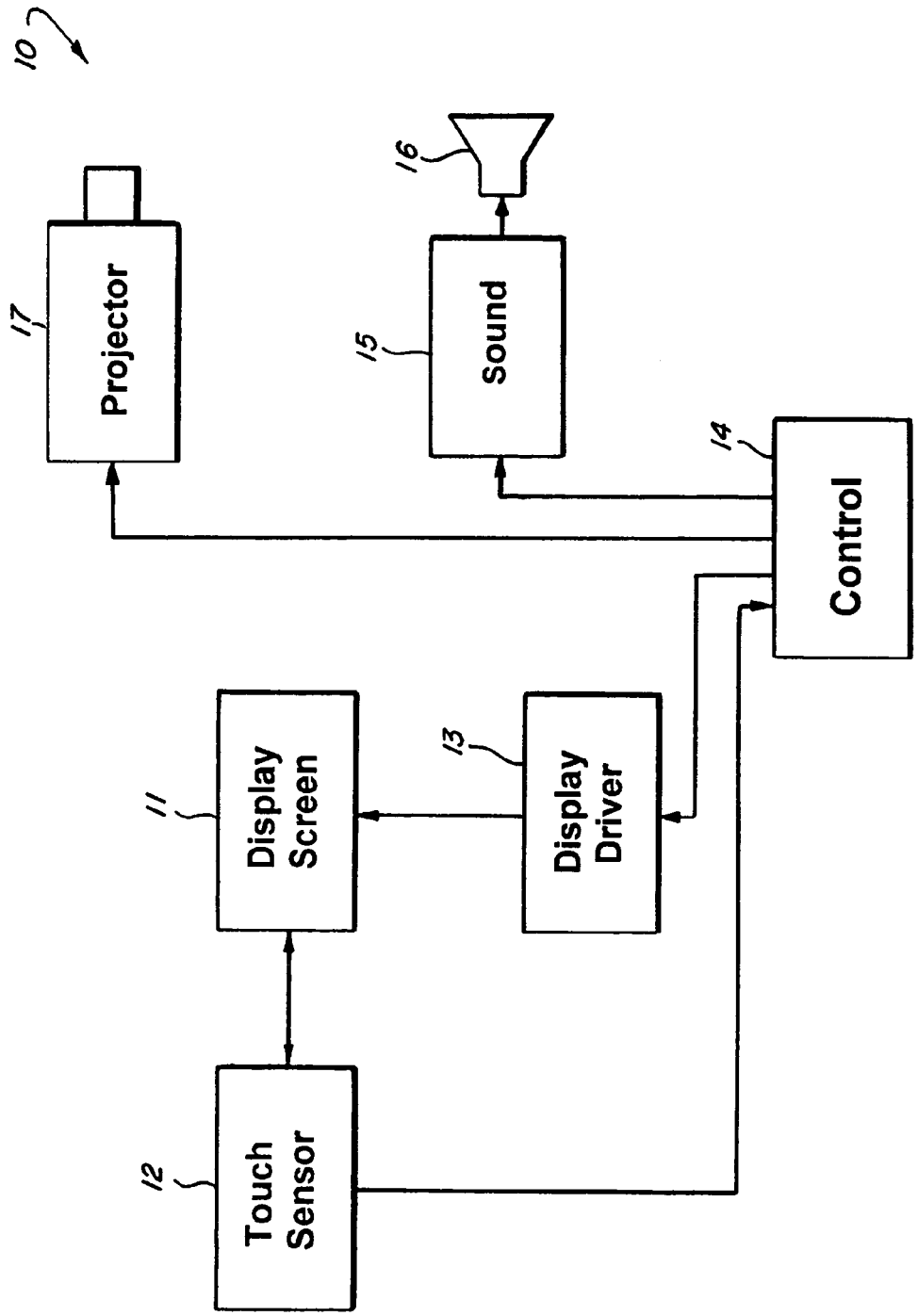

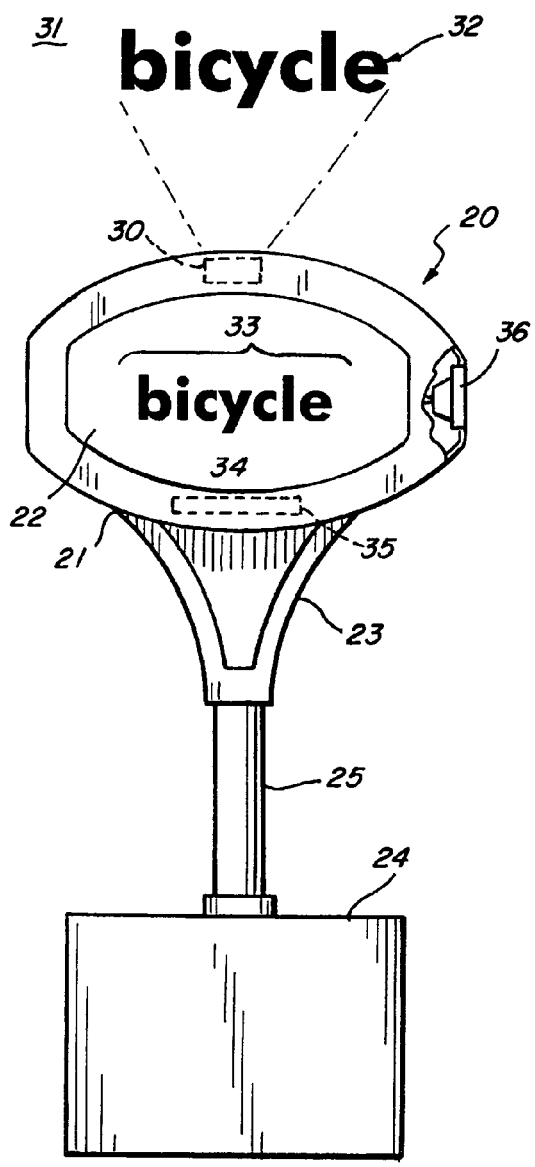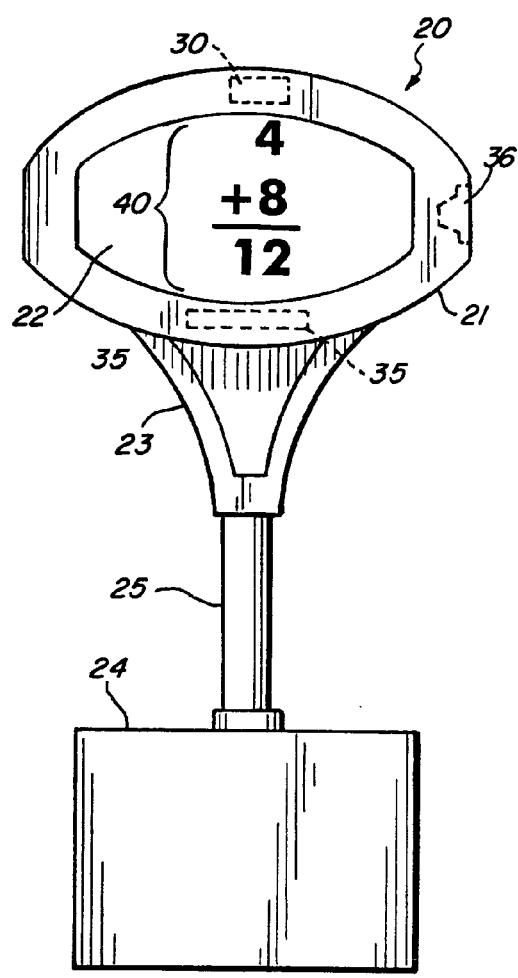
FIG. 2     FIG. 3

APPARATUS AND METHOD FOR IMPACT ACTIVITY LEARNING SYSTEM

CROSS-REFERENCE TO RELATED APPLICATION

This application claims the benefit of and priority under 35 U.S.C. 119(e) of U.S. Provisional Patent Application No. 61/280,303 entitled APPARATUS AND METHOD FOR IMPACT ACTIVITY LEARNING SYSTEM filed Nov. 2, 2009 in the name of Stephen M. Simon, the disclosure of which is hereby incorporated herein by reference.

FIELD OF THE INVENTION

This invention relates generally to learning apparatus and methods and particularly to those which address learning difficulties and disabilities associated with conditions such as dyslexia or the like.

BACKGROUND OF THE INVENTION

Various learning difficulties have been encountered by students and learners through the years which have impeded the learning capabilities of persons in a disproportionate manner to the complexity of the subject matter. One of the most vexing types of learning difficulties which have been encountered is the types of learning difficulties generally described as dyslexia. Dyslexics often see symbols such as printed letters or the like in an unnatural orientation or relationship to other symbols. Practitioners in the art have endeavored these difficulties with limited success.

SUMMARY OF THE INVENTION

The present invention apparatus and method for impact activity learning systems utilizes a combination of simultaneous and interacting stimuli in association with presentation of learning materials which is particularly effective in assisting students with dyslexia or the like. The apparatus and method utilizes physical impact sensory and kinetic activities which yield tactile learning together with associated visual and auditory stimuli. In the basic operation of the present invention apparatus and method, the system flashes a symbol or image segment such as a letter upon a display screen. The learner interacts physically as well as visually with the displayed symbol by punching the punching bag and housing and supporting the screen while pronouncing the letter or other symbol. The apparatus then sounds the same letter. This process is repeated as the user responds to each flashed letter or symbol upon the display screen with a punch and simultaneous articulation of the letter or symbol while the apparatus sounds the displayed letter or symbol. Once the symbol collection is complete, such as a completely spelled word, the apparatus audibly speaks the word and projects the completed symbol set such as the word upon a wall or convenient surface positioned behind and slightly above the learner.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 sets forth a block diagram of the present invention apparatus which provides the present invention method for impact learning systems;

FIG. 2 sets forth a front view of an illustrative apparatus utilized in the present invention method for impact activity learning;

FIG. 3 sets forth a partial front view of the apparatus of FIG. 2 utilizing a different symbol set;

DESCRIPTION OF THE PREFERRED EMBODIMENTS

Figure 4:
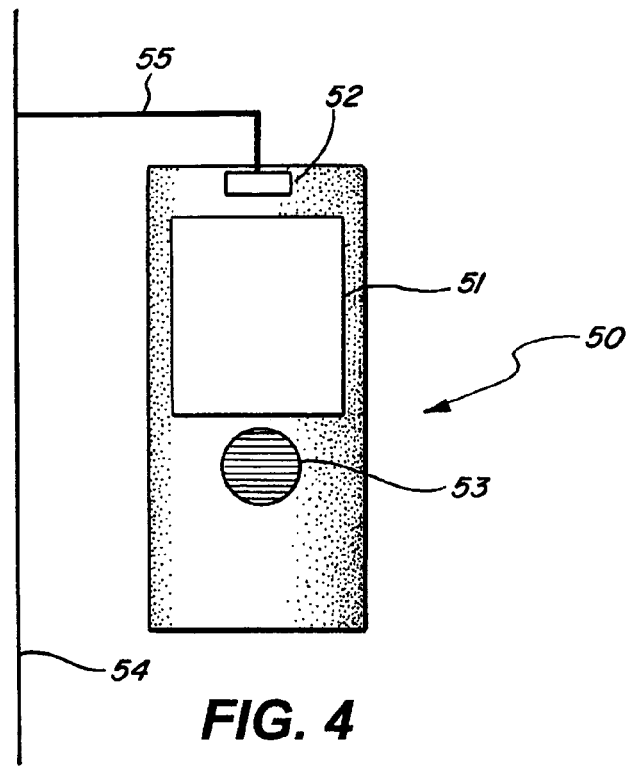
FIG. 4 sets forth a hanging punching bag embodiment of the present invention apparatus.

FIG. 1 sets forth a basic block diagram of the present invention apparatus for impact activity learning systems generally referenced by numeral 10. It will be apparent from the figures below that system 10 may be employed in conjunction with a variety of host apparatus such as the punching bag shown in FIG. 4, the resilient target shown in FIGS. 2 and 3 and the floor mat shown in FIG. 5.

More specifically, system 10 includes a display screen 11 having a display driver 13 operatively coupled thereto. A touch sensor 12 is operatively coupled to display screen 11. A controller 14 is operatively coupled to touch sensor 12 and display driver 13. A sound circuit 15 including a speaker 16 is operated by controller 14. A projector 17 constructed in accordance with conventional fabrication techniques is controlled by controller 14.

In operation, impacts against display screen 11 are sensed by touch sensor 12 and produce a signal input to controller 14. Controller 14 in response to touch sensor 12 produces an audible output signal which is applied to sound circuit 15 and speaker 16. Operation of the present invention system is initiated as controller 14 outputs a symbol such as a letter which is applied to display driver 13. Display driver 13 responds by displaying the selected symbol such as a letter upon display screen 11. Thus, in the anticipated operation of the present invention apparatus and method, controller 14 selects a letter or symbol which is applied to display driver 13 producing a segment image of the letter or symbol upon display screen 11. Thereafter, and in accordance with the present invention learning method, the user punches or otherwise impacts system 10 while speaking the letter or symbol. This punch or impact is sensed by sensor 12 and produces a signal at controller 14. In response to the input from sensor 12, controller 14 produces an audio signal applied to sound output 15 which plays a speech of the letter or symbol through speaker 16. Thereafter controller 14 selects the next image segment or symbol such as the next letter in a word to be applied to display driver 13. In response, display driver 13 displays the next image segment or symbol such as the next letter of a word upon display screen 11. The user then voices the displayed letter while punching system 10 and the process repeats producing an output from touch sensor 12 to which controller 14 responds by audiblizing the next letter through sound system 15 and speaker 16. This process is repetitive as the user continues to respond to display screen 11 by punching system 10 and speaking the displayed letter or other symbol until a completed symbol set such as a completely spelled word is displayed upon display screen 11. Thereafter, controller 14 drives projector 17 to display a projected image of the word of symbol set upon a conveniently located surface such as a wall or the like.

FIG. 2 sets forth an illustrative impact receiving target 20 having a heavily weighted base 24, a support post 25 and a spring support 23 all of which combine to support a frame 21. Frame 21 further supports a display screen 22, a controller circuit 35 and a projector 30. Frame 21 further supports a speaker 36. Projector 30 and speaker 36 are coupled to circuit 35 in the general manner shown in FIG. 1. Display screen 22 is fabricated utilizing an LCD display screen or other suitable apparatus. Of particular advantage is the utilization of a touch responsive screen. Otherwise a separate impact sensor may be provided to sense impacts against display screen 22.

In accordance with the present invention, display screen 22 is shown displaying an image set 33 which will be recognized as comprising the letter which spell the word "bicycle". The letters of bicycle each define image segments of the completed image provided by image set 33.

FIG. 3 sets forth a partial front view of apparatus 20 utilizing a different image set 40. Image set 40 will be shown to have numeric image segments such as image segments 41. It will be apparent to those skilled in the art that the utilization of apparatus 20 in association with arithmetic operations rather than spelling activities can be operated in precisely the same manner as the above described method associated with words. In fact, virtually any symbol set or image set may be utilized without departing from the spirit and scope of the present invention.

FIG. 4 sets forth a simplified diagram of a further alternate embodiment of the present invention apparatus and method for impact activities learning systems generally referenced by numeral 50. System 50 is preferably fabricated to provide a punching bag which is hung from a wall 54 by a conventional punching bag support 55. Thus, it will be apparent that punching bag 50 supports a display screen 51, a projector 52 and a sound output 53. It will be further apparent to those skilled in the art that the embodiment of FIG. 4 utilizes a system in accordance with FIG. 1 set forth and described above. The convenience of having a punching bag for system 50 is found in the interest and amusement value associated with punching bags and the synergistic cooperation of the punching bag as host apparatus for the present invention impact activity learning systems.

Figure 5:
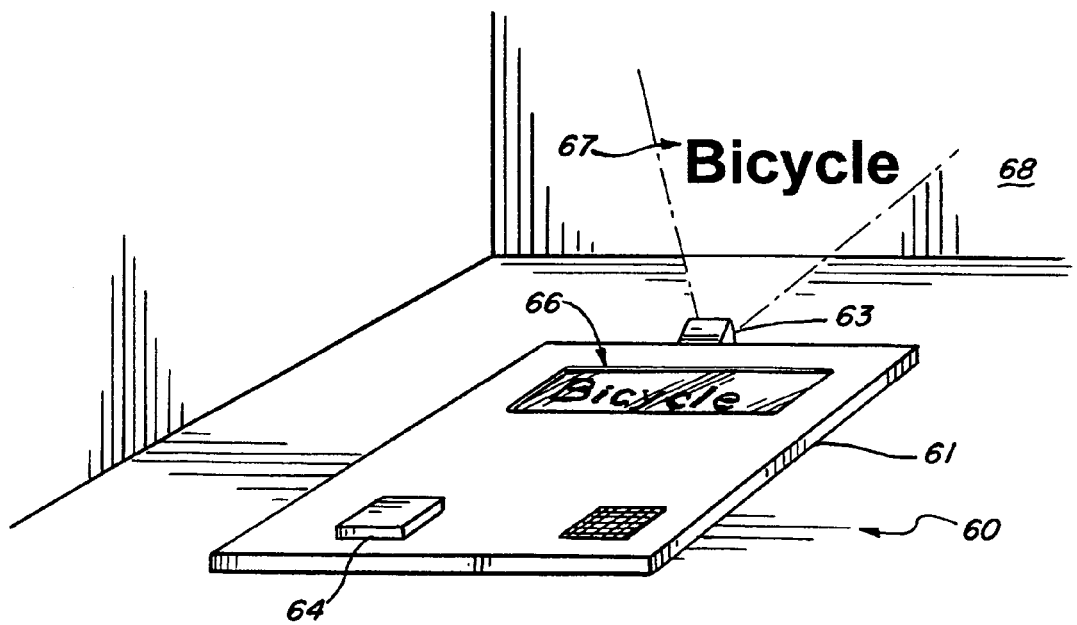
FIG. 5 sets forth a perspective view of a floor mat embodiment of the present invention apparatus.

FIG. 5 sets forth a perspective view of a still further alternate embodiment of the present invention impact activity apparatus and method in which a floor 69 and wall 68 are provided with intersecting generally flat surfaces such as in a room or suitable dwelling. In accordance with the present invention, a target mat 60 preferably formed of a resilient or cushioned material supports a multiple display screen display unit 62. In the preferred fabrication of the present invention, floor mat 61 supports a plurality of LCD screens or the like to provide a larger and more easily observed display screen. A controller 64 and an audio output 65 are also supported within or upon mat 61. Mat 61 further supports a projector 63 which is directed toward wall 68 to produce a projected image 67. Display 62 is shown in FIG. 5 having an image set 66 displayed thereon. It will be apparent to those skilled in the art that displayed image set 66 and projected image 67 comprise the letters forming the letters "bicycle". However, it will be equally apparent to those skilled in the art however that mathematical symbols or other languages or other symbols and images associated with learning activities may be utilized in the present invention system without departing from the spirit and scope thereof.

Figure 6:
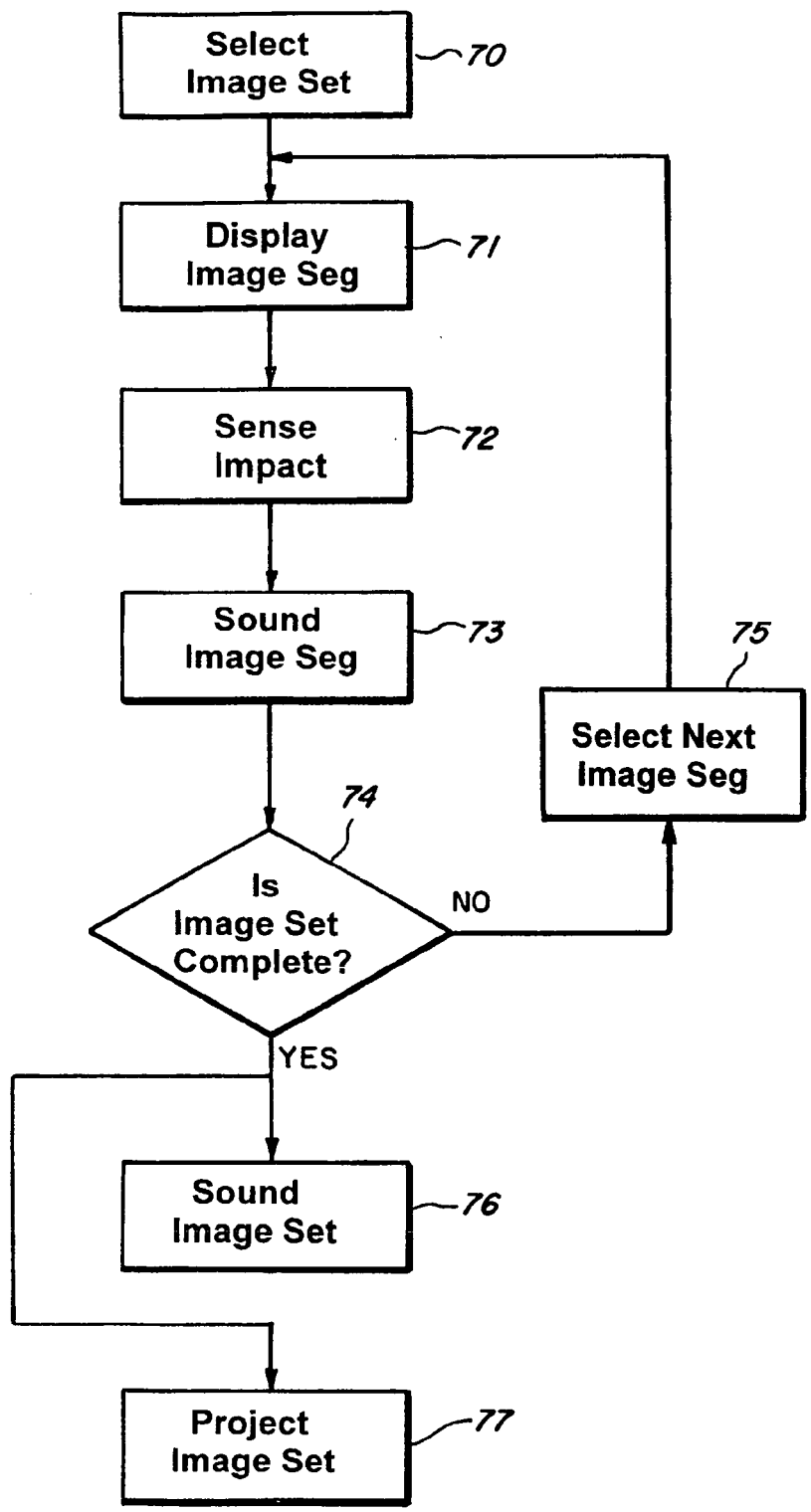
FIG. 6 sets forth a flow diagram of the operation of the present invention method for impact learning.

FIG. 6 sets forth a flow diagram of the method utilized in the present invention apparatus and method for impact activity learning systems. The method is initiated at a step 70 in which an image set such as a word or mathematical expression is selected. Thereafter, the method moves to step 71 in which a single image segment such as the first letter of a word is displayed. Thereafter, the system moves to a step 72 in which a sensing of the punch of the learner is detected. Once the impact is sensed or detected, the system moves to a step 73 in which the image segment such as the letter of a word is audiblized as audible sound. Thereafter, at step 74, a determination is made is to whether the displayed image set is complete. If the image set is note complete such as an incomplete word spelling, the system moves to step 75 selecting the next image segment within image set. In the case of a word this would be the next letter in the word. From step 75, the system returns to step 71 displaying the next image segment in the image set. The system then proceeds again through steps 72, 73 and at step 74 determines once again whether the image set is complete. If still not complete, the system returns to step 75 selecting the next image segment such as the next letter in the to-be-spelled word and thereafter returns to step 71. This cyclical process through steps 71, 72, 73, 74 and 75 continues to cycle until a determination is made at step 74 that the image set is complete. Once again in the example of spelling this would be constituted by a completely spelled word which is now displayed in its entirety. With a complete set of image segments the system now moves to step 76 in which the complete image set is audiblized and simultaneously a projected image of the image set is projected upon a convenient display surface such as a wall.

Thus, in operation in the environment of a spelling lesson, the system selects a word at step 70 and displays the first letter of the word at step 71. The user responds by punching the apparatus while simultaneously voicing the displayed letter. This impact is sensed at step 72 and the system also audiblizes the letter at step 73. At step 74, a determination is made as to whether a complete word has been spelled out. If not, the system moves to step 75 selecting the next letter of the word for display at step 71. The process cycles through each letter of the word with the user providing audiblizing and punching impact in response to each new displayed letter. Once the complete word has been spelled and is displayed, the system then audiblizes the entire word while projecting the completed word upon the nearby wall surface or the like.

In this manner, the user simultaneously employs audio, visual, tactile and physical activity in response to each letter. It has been found that this is particularly advantageous for imprinting the symbols such as letters of words or mathematical symbols or other learning activities symbols to a degree not obtained by simple display and audiblizing. The present invention system is operable in a variety of embodiments with considerable advantage.

It will be apparent to those skilled in the art that the present invention may be implemented by using a variety of currently available apparatus such as popular game units including the game entitled "Wii" as well as others.

The present invention addresses the multisensory techniques that are used at times for all students and frequently for students with learning disabilities. Multisensory techniques and strategies stimulate learning by engaging students on multiple levels. Learning-disabled students have learning differences in one or more areas of spelling, reading, math, listening comprehension, and expressive language. When students are taught using techniques consistent with their learning styles, they learn more easily, quickly & can retain and apply concepts more readily to future learning. The present invention implements these techniques as it helps learners to use all of these senses to collect information about a task and link that information to solve the task. These multisensory techniques that are all inherent in the present invention enable learners to use their personal areas of strength to help them learn.

The present invention addresses the learning needs of various types of learners. Auditory learners benefit from the sounds produced, visual learners are able to visualize the letters as they are projected on a wall, and kinesthetic learners are able to carry out physical activity by punching the bag. The multisensory techniques that are utilized by the present invention include: displaying the images of letters, and eventually words, on a screen, which stimulates visual reasoning & learning. The present invention system audibly articulates the letter sounds and later the words that invoke the auditory process which focuses on sound and elicits verbal reasoning. The present invention system causes the learner to coordinate his/her muscle movements by synchronizing his/her movements when punching the punching bag at the appropriate intervals. This in turn applies to the kinesthetic learning, which involves students carrying out fine and gross motor movement and hand-eye coordination. The present invention system requires the learner to touch the punching bag, which stimulates the sense of touch.

Struggling readers often lack phonemic awareness and the ability to decode words. This invention incorporates sounds of letters that make up words, a key component in the development of spelling and reading skills. Being able to manipulate the phonemes or sounds that make up words is a critical piece for struggling readers and spellers. This invention incorporates phonemic awareness practice. Another key component of learning to spell and read that the present invention addresses is phonics or the sound-symbol connection. By connecting the sound to the image of the letter, students develop their phonetic abilities. The English language has over forty phonetic sounds that the present invention is able to address, including vowels, consonants, blends, diphthongs, and digraphs.

The multisensory nature of the present invention deems it advantageous for very young preschoolers through older learners of all abilities and levels. Another attribute is that it can be modified and adapted for all learners by computerizing new subject information such as: math, that is customized for each individual. The present invention is a remarkably engaging and educational program that can be formulated for anyone.

What has been shown is a novel and highly effective apparatus and method for teaching students and other learners having learning difficulties. The apparatus and method improve imprinting of symbols such as letters or numbers by combining physical impacting with audible and visual stimuli.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A method of impact learning activity requiring a learner to undertake gross motor movements during response, said method comprising said steps of:
   selecting a set of image segments which image segments combined form a complete image set;
   providing an impact responsive display supported by a stabilizing base;
   displaying the first image segment of said set of image segments upon said impact responsive display capable of receiving a gross motor movement impact;
   requiring a learner to inflict a gross motor movement impact upon said impact responsive display:
   sensing an a gross motor movement impact upon said impact responsive display;
   sounding an audible form of said first image segment;
   displaying the next image segment of said set of image segments;
   repeating said steps of sensing an impact, sounding and sequentially displaying the next image segment from said set of image segments until said selected set of image segments is complete and displayed;
   sounding an audible form of said complete set of image segments; and
   projecting said complete set of image segments upon a surface for viewing.

2. The method set forth in claim 1 wherein said step of projecting includes the steps of:
   providing a projector directed toward a point behind and above said display used in said displaying steps.

3. A gross motor movement impact activity learning system comprising:
   a display screen constructed and supported by a stabilizing base in order to withstand
   a gross motor movement impact;
   a display driver coupled to said display screen;
   an impact sensor coupled to said display screen responsive to gross motor movement
   impacts provided by a learner;
   a sound system for producing audible sound;
   an image projector; and
   a controller operatively coupled to said display driver, said touch sensor, and said sound system operative to select a word, display a letter, sense a gross motor movement impact by the learner upon said display screen, sound the letter and to repeat this operation for successive letters until a complete word is spelled.

4. The impact activity learning system set forth in claim 3 further including:
   a projector for projecting an image,
   said controller being operative to sound the complete word and to cause said projector to project the completed word upon a convenient surface.

5. An impact activity learning system comprising:
   means for selecting a set of image segments which image segments combined form a complete image set;
   An impact responsive display for displaying the first image segment of said set of image segments;
   A stabilizing base supporting said impact responsive display in order to sustain a gross motor movement produced impact upon said impact responsive display;
   means for sensing a gross motor movement impact upon said impact responsive display;
   means for sounding an audible form of said first image segment;
   means for displaying the next image segment of said set of image segments;
   means for repeating said steps of sensing an impact, sounding and sequentially displaying the next image segment from said set of image segments until said selected set of image segments is complete and displayed;
   means for sounding an audible form of said complete set of image segments; and a projecting apparatus for projecting said complete set of image segments upon a surface for viewing.

6. The impact activity learning system set forth in claim 5 wherein said projecting apparatus includes:
a projector directed toward a point above and behind said impact responsive display.

7. The method set forth in claim 1 wherein said gross motor movement includes a punch.

8. The gross motor movement impact activity learning system set forth in claim 3 wherein said gross motor movement includes a punch.

9. The impact learning system set forth in claim 5 wherein said gross motor movement includes a punch.

\* \* \* \* \*